United States Patent
Driesen et al.

(10) Patent No.: US 8,880,486 B2
(45) Date of Patent: Nov. 4, 2014

(54) DISTRIBUTED DATABASE SYSTEM UTILIZING AN EXTENDED TWO-PHASE-COMMIT PROCESS

(75) Inventors: Volker Driesen, Walldorf (DE); Peter Eberlein, Malsch (DE)

(73) Assignee: SAP AG, Walldorf (DE)

( * ) Notice: Subject to any disclaimer, the term of this patent is extended or adjusted under 35 U.S.C. 154(b) by 341 days.

(21) Appl. No.: 12/844,662

(22) Filed: Jul. 27, 2010

(65) Prior Publication Data

US 2012/0030184 A1  Feb. 2, 2012

(51) Int. Cl.
*G06F 17/30* (2006.01)
(52) U.S. Cl.
CPC .... *G06F 17/30377* (2013.01); *G06F 17/30557* (2013.01)
USPC .......................................................... 707/703
(58) Field of Classification Search
CPC ..................... G06F 17/30557; G06F 17/30377
USPC .......................................................... 707/703
See application file for complete search history.

(56) References Cited

U.S. PATENT DOCUMENTS

| 5,799,305 | A  | * | 8/1998 | Bortvedt et al. | 1/1 |
| 2002/0059316 | A1 | * | 5/2002 | Kettley et al. | 707/200 |
| 2002/0103816 | A1 | * | 8/2002 | Ganesh et al. | 707/204 |
| 2004/0078467 | A1 | * | 4/2004 | Grosner et al. | 709/226 |
| 2006/0101081 | A1 | * | 5/2006 | Lin et al. | 707/200 |
| 2007/0239661 | A1 | * | 10/2007 | Cattell et al. | 707/2 |

\* cited by examiner

*Primary Examiner* — Hosain Alam
*Assistant Examiner* — Johnese Johnson
(74) *Attorney, Agent, or Firm* — Mintz Levin Cohn Ferris Glovsky and Popeo, P.C.

(57) ABSTRACT

A distributed database system is provided in which a commit coordinator ensures that transactions spanning multiple database instances are committed or rolled back consistently. The commit coordinator utilizes an extended two-phase-commit process. The extension of the two-phase-commit process enables, that if within the distributed database cohorts store redundant data for a productive operation, only one of the cohorts out of a redundancy group are required. By this, the distributed database is prepared to continue operation even during shutdown or failure of single cohorts. Related apparatus, systems, techniques and articles are also described.

19 Claims, 4 Drawing Sheets

| Category | Down time | Re-logon | Description | Visualization |
|---|---|---|---|---|
| AA | 0 | No | "standard operation" Continuous operability without re-logon or re-load. | |
| A | 0 | No | Continuous operability without re-logon but with re-load. | |
| B | 0 | Yes, asyn | Continuous operability with asynchronous re-logon. | |
| C | 0 | Yes, synchr | Continuous operability with simultaneous re-logon (all users logged off at one point in time). (possibly limited functionality before switch over) | |
| D | X min | Yes | System restart less than (half) an hour downtime | |
| E | > 1h | Yes | Predictable downtime of x hours | |

DISTRIBUTED DATABASE SYSTEM UTILIZING AN EXTENDED TWO-PHASE-COMMIT PROCESS

TECHNICAL FIELD

The subject matter described herein relates to a distributed database system which utilizes an extended two-phase commit process.

BACKGROUND

For modern business software, availability is a crucial feature. A company can face huge costs or income cuts, if the business software is down (even for a short period of time). For uninterrupted availability to such business software, unplanned downtime, as well as planned downtime needs to be addressed by organizations. Typically, two approaches are taken. First, business systems are often set up as "high availability" hardware clusters. Such clusters can be expensive due to specific hardware requirements as well as the amount of time and expertise required to set up, test, and maintain such clusters. Second, other mechanisms can be implemented to enable software maintenance without downtime however such mechanisms can increase complexity as well as the risk of failure.

SUMMARY

In one aspect, a method for implementation in a distributed database system comprising a cluster of databases is provided. A commit coordinator in a voting phase sends a query to commit message to a plurality of cohorts. Each cohort is a database instance participating in the cluster of databases and the query requests the cohort to execute a transaction up to a commitment point. The commit coordinator receives replies from (at least a portion of) the plurality of cohorts indicating whether execution of the transaction to the commitment point was successful or if execution of the transaction to the commitment point failed. In cases in which there are cohort mirrors, a reply from a cohort mirror is treated as a reply from the cohort such that only a single reply is needed from a cohort and its mirrors. Thereafter, the commit coordinator in a completion phase, sends a commit message to all of the cohorts if all of the replies indicate that the execution of the transaction to the commitment point was successful. The commit message causes each cohort to complete the transaction and release any locks and resources held during execution of the transaction. Alternatively, the commit coordinator in the completion phase, sends a rollback message to all of the cohorts if one or more of the replies indicate that the execution of the transaction to the commitment point failed (or, in some implementations, if the reply was not received). The rollback message causes each cohort to undo the transaction and release any locks and resources held during execution of the transaction.

The following describes various options which may be implemented singly or in combination depending on the desired configuration. The query to commit message can include a transaction sequence number. In such cases, the cohorts can order execution of the transaction according to the transaction sequence number. The cohorts can execute the transaction to the commitment point and write a first entry to an undo log and a second entry to a redo log. At least one cohort can have a cohort mirror redundantly storing data for such at least one cohort. A reply to the query to commit message by the cohort mirror that execution of the transaction to the commitment point was successful can be treated as a reply indicating same by the corresponding cohort. Failure of a cohort to respond to the query to commit message within a pre-defined amount of time can be treated as a reply that the execution of the transaction to the commitment point failed.

The cohorts can send a rollback acknowledgement message to the commit coordinator in response to receiving the rollback message. In such cases, the commit coordinator can undo the transaction when rollback acknowledgement messages have been received from each cohort, or abort the transaction if the rollback acknowledgement messages have not been received from each cohort. In some implementations, rollback acknowledgment messages can be received from cohort mirrors and treated as if such rollback acknowledgement messages were received from the cohort.

The commit coordinator can initiate a restart process upon a failure of the commit coordinator. The commit coordinator can be coupled to a commit controller watchdog that monitors whether the commit coordinator fails. As part of a restart process, the commit coordinator can request information regarding transactions currently handled by the cohort from each cohort. Such information can include, for example, transaction identification (ID), status, and/or a last message sent by such cohort to the commit coordinator.

The commit coordinator can initiate a fail-over process upon a determination that at least one cohort is going down. The commit coordinator can include an availability monitor module to identify if a cohort is down and/or an availability manager module to notify application servers accessing the cohorts when a particular cohort is down and to initiate restarts of cohorts.

Each cohort can include a log shipping unit module to send and receive database logs and/or a resume manager module to manage resume processes.

In another aspect, a method for implementation in a distributed database system comprising a cluster of databases in which a query to commit message is sent to a plurality of cohorts and to cohort mirrors redundantly storing data for a corresponding cohort. Each cohort and each cohort mirror is a database instance participating in the cluster of databases and the query requests execution of a transaction up to a commitment point. In response to the query to commit message, replies are received from at least a portion of the plurality of cohorts and/or cohort mirrors indicating whether execution of the transaction to the commitment point was successful or if execution of the transaction to the commitment point failed. Thereafter, a commit message is sent to all of the cohorts and cohort mirrors if at least one cohort of each redundancy group replies and all of the replies indicate that the execution of the transaction to the commitment point was successful. The commit message causes each cohort and each cohort mirror to complete the transaction and release any locks and resources held during execution of the transaction. Otherwise, a rollback message is sent to all of the cohorts and cohort mirrors if one or more of the replies indicate that the execution of the transaction to the commitment point failed or if a reply was not received. The rollback message causes each cohort and each cohort mirror to undo the transaction and release any locks and resources held during execution of the transaction.

In a further aspect, a system can include a database system, a plurality of application servers, and a commit coordinator computing system. The database system has a plurality of servers running two or more redundant database instances. The plurality of application servers are coupled to the database system to periodically access data stored within the database system. The commit coordinator computing system is coupled to the plurality of application servers and the database system. The commit coordinator system sends, in a voting phase, a query to commit message to a plurality of cohorts, each cohort being a database instance in the database system, the query requesting the cohort to execute a transaction up to a commitment point; receives replies from the plurality of cohorts indicating whether execution of the transaction to the commitment point was successful or if execution of the transaction to the commitment point failed; and sends, in a completion phase, a commit message to all of the cohorts if all of the replies (i.e., replies from at least one cohort in a redundancy group, etc.) indicate that the execution of the transaction to the commitment point was successful, the commit message causing each cohort to complete the transaction and release any locks and resources held during execution of the transaction; or sends, in the completion phase, a rollback message to all of the cohorts if one or more of the replies indicate that the execution of the transaction to the commitment point failed, the rollback message causing each cohort to undo the transaction and release any locks and resources held during execution of the transaction.

Articles of manufacture are also described that comprise computer executable instructions permanently stored (e.g., non-transitorily stored, etc.) on computer readable media, which, when executed by a computer, causes the computer to perform operations herein. Similarly, computer systems are also described that may include a processor and a memory coupled to the processor. The memory may temporarily or permanently store one or more programs that cause the processor to perform one or more of the operations described herein.

The subject matter described herein provides many advantages. As one example, system downtime is dramatically reduced by providing a distributed database with built-in redundancy. In addition, the response-time of a database can be improved. With conventional systems, if the database is upon committing a transaction ensuring that the log shipping was executed successfully, the response time of the database would be Delta-t_T+Delta-t_L. With the current subject matter, this response time would be down to Delta-t_T (if the max transaction response time is Delta-t_T and the max log shipping time is Delta-t_L).

The current subject matter is also advantageous in that database availability monitoring is performed by a commit coordinator. No additional mechanism is required such as a heartbeat controller between the systems (connected as a failover cluster). As stated below, the commit coordinator runs the two-phase-commit protocol and during each transaction, the commit coordinator communicates with each database instance. If one database instance is down, the commit coordinator is at the next transaction (more precisely at the next communication event with the database instance within a two-phase-commit sequence) identifying whether a database instance is down. The commit coordinator can also trigger the recovery of a database instance which is down.

The current subject matter also obviates the need for switch-over upon a failure because each application server has already set up connections to each instance of the distributed database. If one database instance is down, the required second connection is already in place.

The current subject matter also increases availability. For example, if within one transaction one database instance fails, the traditional approach will roll-back the complete transaction and switch-over to the stand-by cluster. With the current subject matter, the transaction can still be committed, if one database instance is going down because the redundant "partner instance" is still up and committing the transaction.

Another advantage is that testing to confirm that the application continues to work during a fail-over is no longer required. Testing is still required to ensure that an instance which has fallen down can be timely started up and phased in. In this scenario, the remaining "recover and startup" can be tested much more easily during standard operation with additional hardware and filer snapshot mechanisms.

Lastly, another advantage of the current subject matter is that there is only one approach to manage "unplanned" and "planned" downtime. Both approaches are executed rather rarely and thus are from a risk management perspective problematic. If the number of different approaches can be reduced, and the processes can be tested more easily during normal operation, the risk of a failure during a process to manage "unplanned" or "planned" downtime could be reduced.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 4 is a diagram illustrating various categories of availability.

DETAILED DESCRIPTION

Figure 1:
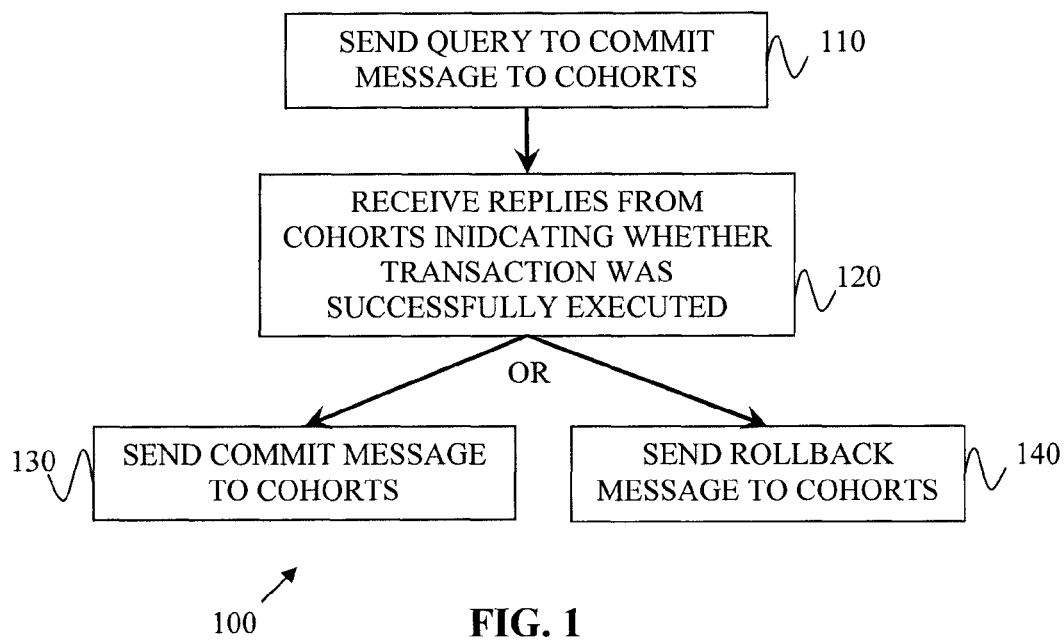
FIG. 1 is a process flow diagram illustrating a method for implementation in a distributed database system comprising a cluster of databases.

FIG. 1 is a processing flow diagram illustrating a method 100 for implementation in a distributed database system comprising a cluster of databases. A commit coordinator in a voting phase, at 110, sends a query to commit message to a plurality of cohorts. Each cohort is a database instance participating in the cluster of databases and the query requests the cohort to execute a transaction up to a commitment point. A cohort can have one or more corresponding cohort mirrors that together form a redundancy group. Thereafter, at 120, the commit coordinator receives replies from the plurality of cohorts indicating whether execution of the transaction to the commitment point was successful or if execution of the transaction to the commitment point failed. Once such replies are received, the commit coordinator, at 130, sends, in a completion phase, a commit message to all of the cohorts if a cohort from each redundancy group replied and all of the replies indicate that the execution of the transaction to the commitment point was successful. The commit message causes each cohort to complete the transaction and release any locks and resources held during execution of the transaction. Alternatively, the commit coordinator, at 140, sends, in the completion phase, a rollback message to all of the cohorts if one or more of the replies indicate that the execution of the transaction to the commitment point failed (or if a reply was not received). The rollback message causes each cohort to undo the transaction and release any locks and resources held during execution of the transaction.

Databases that are so large that they cannot run on a single server need to be distributed and have to put up with the overhead of a two-phase-commit protocol. This is essential for transactions spanning multiple database instances to either commit or rollback consistently and cannot be avoided.

By making a database—central or distributed—highly available, additional overhead for replication of updates from a primary to its secondary database instance and switching over between the two in the case of a failure is often required. Such arrangements usually require special switch-over hardware or software. By leveraging existing infrastructures for implementing two-phase-commit protocols for high availability, additional overhead can be avoided.

The current subject matter extends distributed databases to a setup where additional instances are integrated. The instances hold data redundantly. With this arrangement, the database cluster not only to scales-out and stores a larger set of data, but the redundant database instances increase the availability of the complete cluster.

Figure 2:
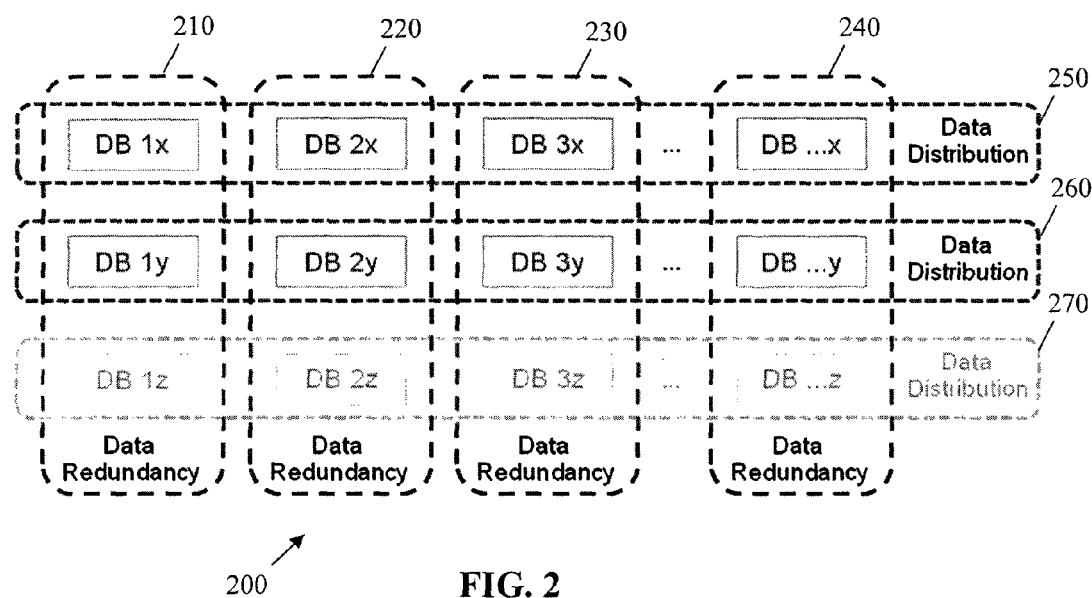
FIG. 2 is a diagram illustrating database instances being distributed across multiple sub-systems.

FIG. 2 is a logic diagram illustrating a distributed and redundant database cluster 200 in which multiple sub-clusters 210, 220, 230, 240 store multiple database instances (DB 1x-DB . . . z) across multiple logical data distribution segments 250, 260, 270 (which are illustrated as separate segments, although such segments may be unitary or distributed depending on the desired configuration).

Figure 3:
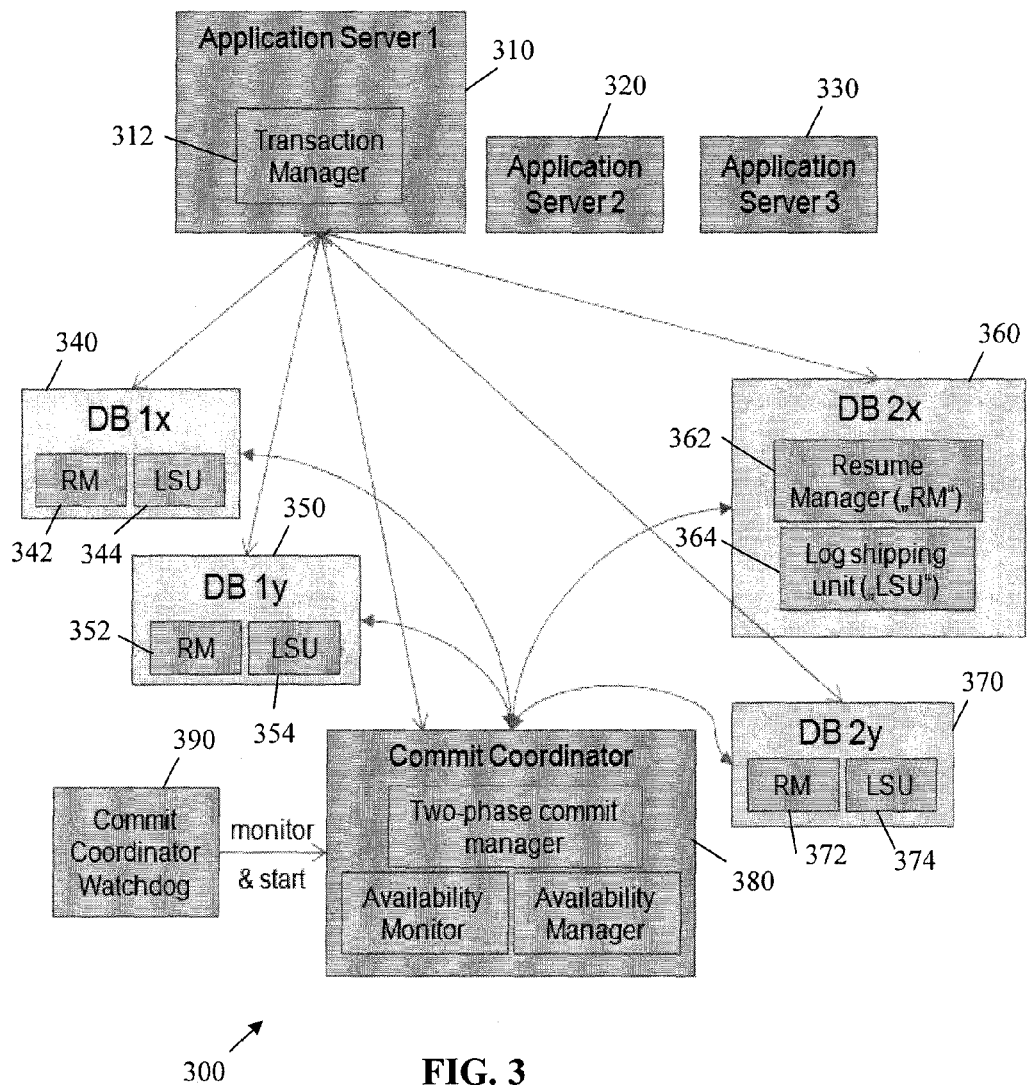
FIG. 3 is a diagram illustrating application servers accessing a plurality of database instances using a commit coordinator.

FIG. 3 is a logic diagram illustrating a system 300 in which application servers 310, 320, 330 communicate with cohorts 340, 350, 360, 370. As used herein, the term "cohort" refers to any database instance DB 1x-DB . . . z participating in the cluster. A cohort can be one of the group of instances storing distributed data as well as of the groups storing redundant data. A "cohort mirror" refers to a database instance partner that stores data redundantly to a certain cohort. Such communications, as described below, can be coordinated by a commit coordinator 380 (which can be executed on a dedicated computing system or as part of the database system). Each application server 310, 320, 330 can directly communicate with any cohort 340, 350, 360, 370 in the cluster 200, including redundant instances. Such an arrangement is different from conventional primary/secondary setup in high-availability scenarios in which the secondary instances receive updates from the primary instance via log shipping and the role of a primary or secondary instance needs to be explicitly switched in case of the failure of the primary instance. In read scenarios, this arrangement has the positive side effect, that the application servers 310, 320, 330 can choose from the available redundant cohorts 340, 350; 360, 370 (e.g., by applying a round-robin algorithm, load balancing algorithm, etc.) and thus reduce the load on each individual server by distributing the work among the redundant cohort. In addition, with this arrangement, the availability of the overall system can be increased by adding further redundant instances, such as a third cohort for covering the failure of both the primary and secondary cohorts 340, 350; 360, 370.

With a setup of two cohorts 340, 350; 360, 370 storing redundant data, the size of the instances can approach peak load sizing such that each instance can take the full load of any requests. In a three or more instances layout, the instances can be sized smaller (if n instances are set up, n−1 instances must be able to manage the peak load, in case one breaks).

In order to coordinate the consistent commit or rollback of all redundant instances that have received updates in parallel directly from the application servers 310, 320, 330, a two-phase-commit protocol can be used as for reaching this consistency among the distributed instances. For example, it makes no difference for the commit protocol if four instances of a distributed database need to reach a conclusion about a commit or rollback or if two distributed instances and their two redundant copies have to do the same. The same protocol and algorithms apply with the only variation of how to react on the failure of one database instance. In case of a redundant setup, the failure of a redundant instance during the commit phase can be handled by taking this failed instance out of the cluster, restarting it and phasing it back into the cluster, without affecting the positive outcome of the just processed transaction.

The following describes a sample set of operations for the "voting phase" of a two-phase-commit protocol. Initially, the commit coordinator 380 can send a query to commit message (which in some implementations includes a transaction sequence number to uniquely identify the corresponding transaction—i.e., the transaction sequence number can continually increase, etc.) to all cohorts 340, 350, 360, 370 and waits until it has received a reply from all cohorts. If transaction sequence numbers are utilized, the cohorts 340, 350, 360, 370 execute transactions in order based on the corresponding transaction sequence numbers provided by the commit coordinator 380 (this ensures that transactions are executed in the same order on all cohorts). In either event, the cohorts 340, 350, 360, 370 can execute the transaction up to the point where they will be asked to commit. Each cohort 340, 350, 360, 370 writes an entry to their respective undo logs and an entry to their respective redo logs. Each cohort 340, 350, 360, 370 replies with an agreement message (cohort votes Yes to commit), if the transaction succeeded, or an abort message (cohort votes No, not to commit), if the transaction failed.

In some implementations, if one cohort 340, 350, 360, 370 does not answer, the cohort can be assumed to be down (e.g., if the cohort does not answer within a period Delta-T_wait-for-instance, it can be assumed to be down). In such scenarios, the non-responsive cohort 340, 350, 360, 370 (i.e., the cohort not answering) can be characterized as/set to "down". If such cohort 340, 360 includes a mirror 350, 370 and such mirror votes with "yes", then the commit can continues. However, if both the cohorts 340, 360 and their respective cohort mirrors 350, 370 do not answer, the database can be assumed to be down and the transaction can be aborted.

The following describes a set of sample operations for the "completion phase" of the two-phase-commit protocol. If the commit coordinator 380 received an agreement message from all cohorts 340, 350, 360, 370 during the voting phase, the commit coordinate can send a commit message to all of the cohorts. Each cohort 340, 350, 360, 370 can then complete the operation, and releases all locks and resources that were being held by such cohorts during the transaction. Thereafter, each cohort 340, 350, 360, 370 can send an acknowledgment message to the commit coordinator 380. The commit coordinator 380 can complete the transaction when acknowledgments have been received.

The commit coordinator 380 can still complete the transaction if the coordinator receives an agreement message from at least each cohort 340, 360 or its mirror 350, 370 (i.e., one acknowledgement message from each "pair" cohort—cohort-mirror). Such a scenario can be utilized when one or more of the cohorts 340, 350, 360, 370 are down such that the commit coordinator 380 can send a commit message to all the cohorts (excluding the cohort, which is down). Each cohort 340, 350, 360, 370 (excluding the cohort, which is down) can completes the operation, and releases all the locks and resources held during the transaction. Each cohort 340, 350, 360, 370 (excluding the cohort, which is down) can send an acknowledgment message to the commit coordinator 380. If there any delays in receiving the acknowledgement messages, the commit coordinator can repeatedly resend the commit message until all cohorts 340, 350, 360, 370 have acknowledged the successful execution.

If one cohort 340, 350, 360, 370 does not send the acknowledgement message and the particular cohort's partner (i.e., mirror) is down (i.e., there is no reply from the redundancy group, etc.), the commit coordinator 380 determines that the transaction has not been successfully and completely processed completely and so the database is considered to be down. However, if the cohort's partner 350, 370 is not down, the cohort 340, 360 not sending the acknowledgement is set to down but the transaction is still committed. The commit coordinator 380 can then complete the transaction when acknowledgments have been received.

Rather than an acknowledgement message, cohorts 340, 350, 360, 370 can send an abort message during the voting phase (which indicates that the particular cohort cannot execute the transaction). When an abort message is received, the commit coordinator 380 can send a rollback message to all the cohorts 340, 350, 360, 370. Each cohort 340, 350, 360, 370 can undo the transaction using their respective undo logs, and release the resources and locks held by such cohort during the transaction. Each cohort 340, 350, 360, 370 sends a rollback acknowledgement message to the commit coordinator 380. The commit coordinator 380 can undo the transaction when all rollback acknowledgement messages have been received. If one cohort 340, 350, 360, 370 does not answer, the cohort is assumed to be down, if the cohort does not answer within a pre-defined period (e.g., Delta-T_wait-for-instance, etc.). The cohort 340, 360 not answering is set to down. If the mirror of the cohort 350, 370 not answering still answers and acknowledges the rollback, the transaction is successfully rolled back. If all cohorts of a redundancy-group 340, 350; 350, 360 do not answer, the database is assumed to be down and the transaction is aborted.

In some implementations, the commit coordinator 380 can provide error handling/availability monitoring functions. For example, if one of the cohorts 340, 350, 360, 370 has been set to down during the process, no further "query to commit" messages can be sent to this cohort by the commit coordinator 380. A process is then initiated to restart and phase-in the failed instance, an ID for such database instance (DB-ID_down) can be passed to this process. The application servers 310, 320, 330 can be notified that DB-ID_down is not available for update or query. Thereafter, a failover procedure is triggered such that, upon restart, the database instance needs to roll-back the transaction TR-ID_down.

If all cohorts of a redundancy-groups 340, 350; 360, 370 did not answer, then upon restart of the cohorts, the commit coordinator 380 can cause the cohorts to roll-back consistently all open transactions (consistent throughout the cluster).

The commit coordinator 380 can be characterized a "single point of failure". In addition, the commit coordinator 380 can be characterized as being stateless, which eases the handling upon failure. If the commit coordinator 380 is failing, the process can be restarted. This can be accomplished by a tool monitoring the controller, e.g. a commit coordinator watchdog module 390, etc.) Upon restart, the commit coordinator 380 can connect to the cohorts 340, 350, 360, 370 and request information regarding the current transaction(s) such as transaction ID status, last message sent to the commit coordinator, and the like. For each open transaction reported back, the commit coordinator 380 can determine the status of the different cohorts 340, 350, 360, 370 and resumes operation for each transaction.

If during the failure of the commit coordinator 380, a cohort 340, 350, 360, 370 fails, the commit coordinator will upon resumption identify also the failure of the cohorts and proceed with the transaction handling with this instance being "down", notifying the dialog instances, that such cohort is down and initiating the cohort restart process.

The commit coordinator 380 can detect if one cohort 340, 350, 360, 370 is going down. In such cases, the commit coordinator 380 can initiate the fail-over procedure that starts a process to control the restart and phase in. The control process can receives the instance ID of the failed cohort 340, 350, 360, 370 and the transaction ID where the cohort failed.

The fail-over procedure can include three phases. In a first phase which can be characterized as "restart and roll-forward"), the cohort 340, 350, 360, 370 DB-ID_down which failed can be stopped (if necessary in a "force mode"). Such cohort 340, 350, 360, 370 can be started again and all open transactions can be rolled back. The cohort 340, 350, 360, 370 can identify the sequence number of the last successfully committed transaction: TR-ID-successful so that the roll can start at TR-ID_roll-start=TR_ID_successful+1. The cohort 340, 360 requests the redo-log from the redundancy partner cohort 350, 370 and "rolls-forward", starting from transaction TR-ID_roll-start (it can be assumed that the ID of latest transaction in the roll-forward is TR-ID_roll-done).

In a second phase, the restarted cohort 340, 350, 360, 370 needs to catch-up. The cohort 340, 350, 360, 370 is up again and has rolled-forward to TR-ID_roll-done. The cohort 340, 350, 360, 370 can then register at the commit coordinator 380. In addition, the cohort 340, 350, 360, 370 can receive the currently processed transaction at the commit coordinator: TR-ID_re-register. The cohort 340, 350, 360, 370 can receive the transactions from the commit coordinator 380 starting with TR-ID_re-register+1. These transactions can be queued by the cohort 340, 350, 360, 370. The cohort 340, 360 can then request the redo-log from the redundancy partner cohort 350, 370 from TR-ID_roll-done+1 to TR-ID_re-register. Once the cohort 340, 360 has rolled-forward to TR-ID_re-register, the cohort can process the queued transactions (starting with TR-ID_re-register+1), still without participating in the voting and acknowledgement.

In a third phase, the restarted cohort 340, 360 needs to be phased in to the operational process again. The cohort 340, 360 can notify the commit coordinator 380 that it is back (i.e., that it is operational). The commit coordinator 380 can identify the current transaction ID: TR-ID_back and queue further incoming transactions without starting to process them. The commit coordinator can wait until the resuming cohort 340, 360 has reported that the execution of TR-ID_back is executed. The cohort 340, 360 can then notify the commit coordinator 380 for each completed transaction. The commit coordinator 380 can, at some point, identify that the cohort 340, 360 has completed TR-ID_back and that the catch-up is completed. Thereafter, the commit coordinator 380 can resume the operation (i.e., start processing the queued transactions again, etc.) and include the resumed cohort 340, 360 in the vote and acknowledgement process. If the resume process at some point breaks, the phase-in can be stopped and the instance recovery can be restarted. Operations can continue without the cohort 340, 360 which is down.

In some variations, a process can be implemented for a rolling update of the database software without downtime. A rolling update procedure can be applied for the cohort software, resulting in a high level of availability. The following sequence can be repeated for each cohort 340, 350, 360, 370. The cohort 340, 350, 360, 370 can be set, in the commit coordinator 380, as down. Once all open transactions are finalized, and all running read queries are satisfied, the cohort 340, 350, 360, 370 can be stopped. The software for such cohort 340, 350, 360, 370 can be updated and then started up again. The three phases described above (e.g., roll-forward, catch-up and phase-in processes) can then be executed. Once the cohort 340, 350, 360, 370 is operative again, the process can be started for the next cohort. This sequence is repeated until all cohorts 340, 350, 360, 370 are updated.

With this approach, "planned downtime" for updating the database software can also be addressed. In addition, an update of the operating system of a cohort 340, 350, 360, 370 can be handled, as well as hardware maintenance or moving one instance to another host.

As stated above, the commit coordinator 380 is a module that manages the two-phase steps described herein. To that end, the commit coordinator can include a two-phase commit manager 302 module. In addition, an availability monitor module 384 forming part of the commit coordinator 380 can manage the availability monitoring (i.e., identifying if a cohort 340, 350, 360, 370 is down). An availability manager module 386 can manage the availability of the cohorts 340, 350, 360, 370 and notify a transaction manager module 312 in the application server 310, that a certain cohort is down, as well as initiating the cohort restart. The availability manager module 386 can also manage the rolling update of instances within the cluster. The commit coordinator 380 can be monitored and potentially restarted by the commit coordinator watchdog module 390.

The cohorts 340, 350, 360, 370 can each include a log shipping unit module 344, 354, 364, 374 to send and receive database logs needed for a roll-forward process. The cohorts 340, 350, 360, 370 can also each include a resume manager module 342, 352, 362, 372 that manages resume and phase-in process.

The transaction manager module 312 (which can form part of each application server 310, 320, 330 can send transactions to all cohorts which act as a redundancy group 360, 370. The transaction manager module 312 can stop sending transactions to a cohort 340, 350, 360, 370 that is reported to be down. The transaction manager module 312 can also perform the distribution mechanism for read-only transactions to a single cohort group holding the distributed data.

FIG. 4 is a diagram 400 illustrating various categories of availability for a distributed database system with the visualization column illustrating time on the X-axis and the use of old software as compared to new software on the Y-axis. With category AA, there is no need for a re-logon or re-load, operations continues, potentially with reduced performance or capacity. In this scenario, old and new software run in parallel for a period of time and are both productively used. With category A, the consumer potentially needs to re-load the application but does not need to re-logon. This results in the old and new software running in parallel for a period of time such that both are productively used. With category B, the consumers need to re-logon, but this re-logon is not synchronized for different consumers. There is a period of time, where the users can re-logon. Each user experiences a downtime for his individual re-logon. With this scenario, old and new software run in parallel for a period of time and are both productively used. With category C, the consumers need to re-logon, but this is a synchronized event. There is one point in time, where there is no user logged in. Each individual user potentially experiences a downtime longer than a individual re-logon, because there will most likely be a phase-out period, where users are logged-off (e.g. after a commit transaction) and cannot logon immediately again. With category D, the consumers are logged off, the system is restarted, and the consumers can logon again. With category E, there is a defined time period needed to stop and start downtime. Typical high availability setup with a mirror system, log-shipping and failing over upon the original system break-down, will result in downtime of category D or even E. For a standard maintenance process for DB software update, the downtime will be of category D or E as well. With the current technique of rolling update for DB software, category B can be achieved. With the approach described herein, category A can be achieved, potentially with a delay in response-time during the "phase in" described above.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. Other embodiments may be within the scope of the following claims.

What is claimed is:

1. A method for implementation in a distributed database system comprising a cluster of databases, the method comprising:
    sending, by a commit coordinator in a voting phase, a query to commit message to a plurality of cohorts, each cohort being a database instance participating in the cluster of databases, at least one cohort being a cohort mirror redundantly storing data for a corresponding cohort, the query requesting the cohort to execute a transaction up to a commitment point;
    receiving, by the commit coordinator, replies from the plurality of cohorts indicating whether execution of the transaction to the commitment point was successful or if execution of the transaction to the commitment point failed, wherein a reply to the query to commit message sent by the cohort mirror directly to the commit coordinator indicating that execution of the transaction to the commitment point was successful is treated as a reply indicating same by the corresponding cohort;
    sending, by the commit coordinator in a completion phase, a commit message to all of the cohorts if all of the cohorts reply and all of the replies indicate that the execution of the transaction to the commitment point was successful, the commit message causing each cohort to complete the transaction and release any locks and resources held during execution of the transaction; or
    sending, by the commit coordinator in the completion phase, a rollback message to all of the cohorts if one or more of the replies indicate that the execution of the transaction to the commitment point failed, the rollback message causing each cohort to undo the transaction and release any locks and resources held during execution of the transaction;
    initiating, by the commit coordinator, a restart process upon a failure of the commit coordinator; and
    queuing, by the commit coordinator, without starting processing the incoming transactions until a restarted cohort executing a current transaction sends a message indicating completion of the current transaction.

2. A method as in claim 1, wherein the query to commit message includes a transaction sequence number.

3. A method as in claim 2, wherein the cohorts order execution of the transaction according to the transaction sequence number.

4. A method as in claim 1, wherein the cohorts execute the transaction to the commitment point and write a first entry to an undo log and a second entry to a redo log.

5. A method as in claim 1, wherein cohorts and their cohort mirrors form redundancy groups.

6. A method as in claim 1, wherein failure of a cohort to respond to the query to commit message within a pre-defined amount of time is treated as a reply that the execution of the transaction to the commitment point failed.

7. A method as in claim 1, wherein the cohorts send a rollback acknowledgement message to the commit coordinator in response to receiving the rollback message, and wherein the method further comprises:
    undoing, by the commit coordinator, the transaction when rollback acknowledgement messages have been received from each cohort; or
    aborting, by the commit coordinator, the transaction if the rollback acknowledgement messages have not been received from each cohort.

8. A method as in claim 1, wherein at least one cohort has a cohort mirror redundantly storing data for such at least one cohort, and wherein the cohorts and/or their respective cohort mirrors send a rollback acknowledgement message to the commit coordinator, and wherein the method further comprises:
    undoing, by the commit coordinator, the transaction when rollback acknowledgement messages have been received from each cohort and/or its cohort mirror; or
    aborting, by the commit coordinator, the transaction if the rollback acknowledgement messages have not been received from each cohort and/or its cohort mirror.

9. A method as in claim 1, wherein the commit coordinator is coupled to a commit controller watchdog, the commit controller watchdog monitoring whether the commit coordinator fails.

10. A method as in claim 1, further comprising:
    requesting, by the commit coordinator from each cohort, information regarding transactions currently handled by the cohort.

11. A method as in claim 10, wherein the information regarding transactions currently handled by the cohort include one or more of: transaction identification, status, and a last message sent by such cohort to the commit coordinator.

12. A method as in claim 1, further comprising: initiating, by the commit coordinator, a fail-over process upon a determination that at least one cohort is going down.

13. A method as in claim 1, wherein the commit coordinator comprises an availability monitor module to identify if a cohort is down.

14. A method as in claim 1, wherein the commit coordinator comprises an availability manager module to notify application servers accessing the cohorts when a particular cohort is down and to initiate restarts of cohorts.

15. A method as in claim 1, wherein each cohort comprises:
    a log shipping unit module to send and receive database logs.

16. A method as in claim 15, wherein each cohort comprises: a resume manager module to manage resume processes.

17. A method as in claim 1, wherein the transaction was sent to the commit coordinator by an application server, the application server executing a transaction manager module for sending transactions to all cohorts which act as a redundancy group.

18. A method for implementation in a distributed database system comprising a cluster of databases, the method comprising:
    sending a query to commit message to a plurality of cohorts and to cohort mirrors redundantly storing data for a corresponding cohort, each cohort and each cohort mirror being a database instance participating in the cluster of databases, the query requesting execution of a transaction up to a commitment point;
    receiving replies from at least a portion of the plurality of cohorts and/or cohort mirrors indicating whether execution of the transaction to the commitment point was successful or if execution of the transaction to the commitment point failed, wherein a reply to the query to commit message sent by the cohort mirror directly to the commit coordinator indicating that execution of the transaction to the commitment point was successful is treated as a reply indicating same by the corresponding cohort; and sending a commit message to all of the cohorts and each cohort mirror if the replies indicate that the execution of the transaction to the commitment point was successful, the commit message causing each cohort and each cohort mirror to complete the transaction and release any locks and resources held during execution of the transaction; or sending a rollback message to all of the cohorts and each cohort mirror if one or more of the replies indicate that the execution of the transaction to the commitment point failed or if a reply was not received, the rollback message causing each cohort and each cohort mirror to undo the transaction and release any locks and resources held during execution of the transaction.

19. A system comprising:

a database system having a plurality of servers running two or more redundant database instances, each server comprising memory and at least one programmable data processor;

a plurality of application servers coupled to the database system to periodically access data stored within the database system, each application server comprising memory and at least one programmable data processor;

a commit coordinator computing system coupled to the database system and the plurality of application servers, the commit coordinator computing system comprising memory and at least one programmable data processor;

wherein the commit coordinator computing system:

sends a query to commit message to a plurality of cohorts and to cohort mirrors redundantly storing data for a corresponding cohort, each cohort and each cohort mirror being a database instance, the query requesting execution of a transaction up to a commitment point;

receives replies from at least a portion of the plurality of cohorts and/or cohort mirrors indicating whether execution of the transaction to the commitment point was successful or if execution of the transaction to the commitment point failed; and sends a commit message to all of the cohorts and each cohort mirror if the replies indicate that the execution of the transaction to the commitment point was successful, the commit message causing each cohort and each cohort mirror to complete the transaction and release any locks and resources held during execution of the transaction; or sends a rollback message to all of the cohorts and each cohort mirror if one or more of the replies indicate that the execution of the transaction to the commitment point failed or if a reply was not received, the rollback message causing each cohort and each cohort mirror to undo the transaction and release any locks and resources held during execution of the transaction;

wherein:

if one of the cohorts has been set down during the commit process, no further query to commit messages are sent to the cohort by the commit coordinator, and a fail-over procedure is subsequently initiated to restart and phase-in such cohort, the fail-over procedure comprising a restart and roll-forward phase followed by a registration phase followed by a phase-in phase;

a reply to the query to commit message that is sent by the cohort mirror directly to the commit coordinator and which indicates that execution of the transaction to the commitment point was successful is treated as a reply indicating same by the corresponding cohort.

* * * * *